United States Patent
Wienecke

[11] 3,852,613
[45] Dec. 3, 1974

[54] ARRANGEMENT TO TEST THE OPERATION OF AN ANTISKID SYSTEM

[75] Inventor: Franz Josef Wienecke, Oberstedten, Germany

[73] Assignee: ITT Industries, Inc., New York, N.Y.

[22] Filed: Aug. 23, 1973

[21] Appl. No.: 391,170

[52] U.S. Cl............ 307/10 R, 303/21 AF, 340/52 B
[51] Int. Cl................................................. B60t 8/00
[58] Field of Search............... 303/21 AF; 180/82 R; 307/10 R; 340/52 R, 52 B

[56] References Cited
UNITED STATES PATENTS

| | | | |
|---|---|---|---|
| 3,275,384 | 9/1966 | Hirzel | 303/21 AF |
| 3,620,577 | 11/1971 | Neisch | 303/21 AF |
| 3,667,812 | 6/1972 | Carp et al. | 303/21 AF |
| 3,702,206 | 11/1972 | Sweet | 303/21 AF |
| 3,796,469 | 3/1974 | Birge | 303/21 AF |

Primary Examiner—Herman J. Hohauser
Attorney, Agent, or Firm—John T. O'Halloran; Menotti J. Lombardi, Jr.; Alfred C. Hill

[57] ABSTRACT

This relates to an arrangement to test the operation of an antiskid system contained in a vehicle upon starting the engine of the vehicle but prior to the movement thereof. The arrangement includes a test circuit activated by the ignition key to test the electronic and hydraulic components of an antiskid system through an entire antiskid control cycle. In addition the arrangement includes a logic circuit to disable the testing of the antiskid system if the parking brake is not set, or if the automatic transmission gear select is not in the park position, or if the brake pedal or the hydraulic brake system is activated. This will prevent the vehicle from rolling particularly when parked on a hill, since during an antiskid control cycle the hydraulic brake system is rendered inoperative.

8 Claims, 1 Drawing Figure

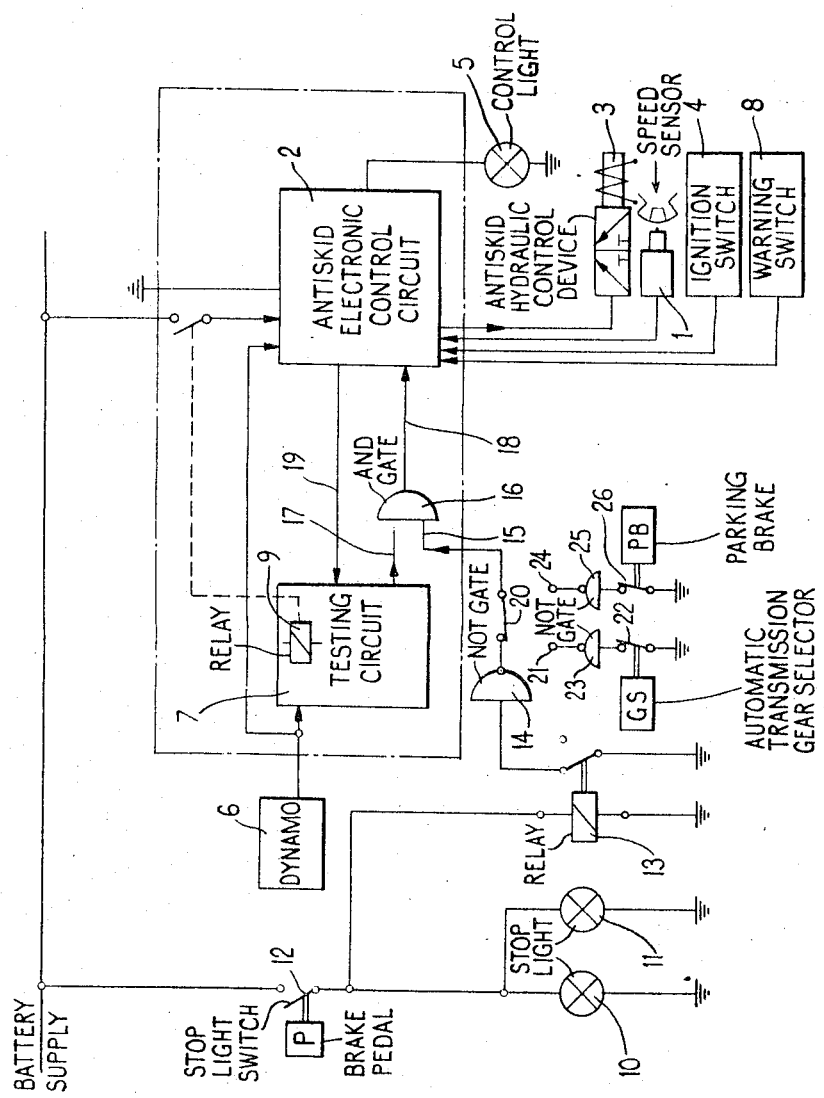

ARRANGEMENT TO TEST THE OPERATION OF AN ANTISKID SYSTEM

BACKGROUND OF THE INVENTION

This invention relates to an antiskid control system and more particularly to an arrangement for testing the correct functioning of the antiskid system by having all components of the antiskid system go through one antiskid control cycle before starting to drive.

It has already been proposed to provide an antiskid control system with an arrangement to have all the components of the antiskid control system perform an antiskid control cycle when starting the engine of the vehicle. On the one hand, the driver can in this way examine, before he starts the vehicle, whether or not the antiskid system is functioning correctly, and, on the other hand, whether the valves, seals and other sensitive elements have become ineffective because they have not been used for a long period of time.

This one-time testing of the control operation of the antiskid system is preferably coupled with the ignition switch. But this has a result that — when starting the engine of the vehicle — every braking action of the hydraulic braking system is rendered inoperative.

A vehicle which is standing on the slope of a hill and which is held by the driver only with the foot brake, therefore, will roll forwards or backwards when, together with the actuation of the ignition switch, the control cycle of the antiskid device is operated automatically. Of course, this is extremely unpleasant for the driver and when there is not much room, this may even lead to small damages to the vehicle.

SUMMARY OF THE INVENTION

It is the object of this invention to avoid this disadvantage and provide an arrangement in which the brake action of the hydraulic brake system is not rendered inoperative during the testing process of the antiskid control system when starting the engine of the vehicle.

A feature of the present invention is the provision of an arrangement to test the operation of an antiskid control system contained in a motor vehicle prior to moving the vehicle comprising: an antiskid control system; a testing circuit actuated by an ignition switch to provide a testing signal to cause the antiskid control system to go through one cycle of antiskid operation; and a circuit arrangement coupled between the antiskid control system and the testing circuit to enable the testing signal to be coupled to the antiskid control system only upon occurrence of one of an inoperative hydraulic brake system, an operative parking brake, and an automatic transmission gear selector set to park position.

According to another feature of the present invention, the testing process is inhibited when the hydraulic brake system is actuated.

Still another feature of the present invention is to dispose an AND gate between the testing circuit which is to be actuated by the ignition switch and the test input of the antiskid electronic control circuit. The AND gate has a first input coupled to the stop lights, its second input connected with the outlet of the testing circuit and its output connected with the test input of the antiskid electronic control circuit. A relay is arranged in parallel with the stop lights, the contacts of which produce a logic high signal to the first input of the AND gate when the relay is not being energized. The contacts of the relay set up — when the relay is not being energized — an earth connection via a NOT gate to the first input of the AND gate.

A further feature of the present invention is the provision of inhibiting the testing process when the hand brake or parking brake is not actuated or set.

Still a further feature of the present invention is the provision of inhibiting the testing process when the automatic gear selector is not switched to the parking position.

BRIEF DESCRIPTION OF THE DRAWING

The above-mentioned and other features and objects of this invention and the manner of obtaining them will become more apparent by reference to the following description taken in conjunction with the drawing, the single FIGURE of which is a schematic diagram of an arrangement to test an antiskid control system in accordance with the principles of the present invention.

DESCRIPTION OF THE PREFERRED EMBODIMENTS

During braking an antiskid control process is going on in the following way. Speed sensors 1, which are disposed at the vehicle wheels, transmit electrical signals, according to the state of motion of the respective wheel, to the antiskid electronic control circuit 2 which is preferably formed by electronic logic circuitry. Here the signals measured by sensors 1 are processed and when there is the danger of wheel skid, control circuit 2 produces actuating signals for the antiskid hydraulic control device 3 (valves, plunger, etc.) which influence the brake pressure in the wheels in the sense of the antiskid control.

The antiskid system must, however, be put out of operation so that a normal braking is possible, when there is a failure in the electronics, which would lead to a permanent energizing of one or several hydraulic control devices, or when there is an interruption or short circuit of a valve line or a valve operating winding. When the antiskid control system is operating a safety circuit permanently monitors these points and puts the antiskid system out of operation when one of the mentioned cases occurs and a control light lights up. In addition, immediately before starting to drive an operating test is carried out.

When starting the vehicle, the ignition device or switch 4 transmits a signal to control circuit 2, which makes the control light 5 light up for testing itself. After the motor has been started, on the one hand, control circuit 2 receives voltage from the dynamo 6, and, on the other hand, the testing circuit 7 is switched on, which in a faultless system causes a one-time test of an antiskid control cycle and energizes all valves 3 one-time for a short period. Test circuit could be a signal generator and associated circuitry to produce in sequence critical antiskid deceleration and acceleration signals simulating the signals produced by speed sensors 1 to cause control circuit 2 and hydraulic control device 3 to proceed through one complete antiskid control cycle. When the antiskid system is intact in all its parts, control light 5 goes out and will light up again only when the next testing process takes place. A warning switch 8 indicates that the necessary minimum pressure exists in the hydraulic reservoir of the hydraulic brake system. When the dynamo 6 fails, control circuit 2 can, via a relay 9 of testing circuit 2, be connected to the battery of the vehicle.

To prevent the vehicle from rolling on a hill when the braking action of the hydraulic brake system is rendered inoperative by the control cycle of the antiskid control system, a relay 13 is arranged in parallel with the stop lights 10 and 11 which are to be connected to the battery of the vehicle via the stop light switch 12. When relay 13 is not being energized, the input to a NOT gate 14 is connected via contacts of relay 13 to ground, while when the relay 13 is being energized, this connection to ground is interrupted. The output of NOT gate 14 is connected to the first input 15 of an AND gate 16, the second input 17 of which is connected with the outlet of testing circuit 7. The outlet 18 of AND gate 16 transmits the testing control signal to control circuit 2, when logic high signal is produced on input 15. When the vehicle is standing on a flat level, the driver does not have to actuate the hydraulic brake system when starting the engine; the stop light switch 12 remains open and the relay 13 is not energized. By the then existing connection of the input of NOT gate 14 with ground a logic high output signal appears at the input 15 of AND gate 16. After actuating the ignition switch, the testing circuit 7 receives voltage from the dynamo 6 and gives a signal which exists as input signal at the second input 17 of AND gate 16 which provides the testing control signal to control circuit 2 and, thus, initiates the one-time testing of an antiskid control cycle. Via a connection 19 control circuit 2 reports the intact state of the antiskid system.

When the vehicle is standing on a slope and when the driver holds it with the foot brake, stop light switch 12 is closed and connects stop lights 10 and 11 and relay 13 to the battery of the vehicle. Relay 13 interrupts the connection of the input of NOT gate 14 with ground and at its negated output the logic high signal disappears. Since after the actuation of the ignition switch, the signal of the testing circuit 7 exists only at the input 17 of AND gate 16 and no testing control signal appears at output 18 and the one-time control cycle for controlling the operation of the antiskid system cannot take place and, therefore, the braking action of the hydraulic brake system remains intact and the vehicle cannot roll forwards or backwards.

The same results and advantages can be obtained by permitting the testing process of the antiskid system to take place when other devices are actuated to prevent the vehicle from moving. One possibility would be the automatic transmission gear selector, i.e., the antiskid system is tested only when the automatic transmission gear selector is switched to the parking position. Thus, when switch 20 is moved to contact 21 and selector GS closes switch 22, NOT gate 23 is connected to ground and a logic high is placed on input 15 of AND gate 16.

In addition, when switch 20 is moved to contact 24 and parking brake PB is applied or set, switch 26 is closed connecting ground to NOT gate 25 and a logic high is placed on input 15 of AND gate 16.

While I have described above the principles of my invention in connection with specific apparatus, it is to be clearly understood that this description is made only by way of example and not as a limitation to the scope of my invention as set forth in the objects thereof and in the accompanying claims.

I claim:

1. An arrangement to test the operation of an antiskid control system contained in a motor vehicle prior to moving the vehicle comprising:
   a hydraulic brake system having stop lights;
   a parking brake;
   an automatic transmission gear selector having a park position;
   an ignition switch;
   an antiskid control system having an electronic control circuit and a hydraulic control device;
   a testing circuit actuated by said ignition switch to produce a testing signal to cause said electronic control circuit and said hydraulic device to go through one entire cycle of antiskid operation; and a circuit arrangement coupled between said electronic control circuit and said testing circuit and to said hydraulic brake system, said parking brake and said gear selector to enable said testing signal to be coupled to said electronic control circuit only upon occurrence of one or more of any of the following conditions; said hydraulic brake system being inoperative, said parking brake being operative, and said automatic transmission gear selector being set to said park position.

2. An arrangement according to claim 1, wherein said circuit arrangement includes
   a two input AND gate having one input coupled to the output of said testing circuit and an output coupled to a test input of said electronic control circuit; and
   circuit means to provide a logic high on the other input of said AND gate upon occurrence of an operative parking brake.

3. An arrangement according to claim 2, wherein said circuit means includes
   a not gate having its output coupled to said other input of said AND gate, and
   means to connect ground potential to the input of said NOT gate upon occurrence of an operative parking brake.

4. An arrangement according to claim 1, wherein said circuit arrangement includes
   a two input AND gate having one input coupled to the output of said testing circuit and an output coupled to a test input of said electronic control circuit; and
   circuit means to provide a logic high on the other input of said AND gate when said gear selector is set to said park position.

5. An arrangement according to claim 4, wherein said circuit means includes
   a NOT gate having its output coupled to said other input of said AND gate, and
   means to connect ground potential to the input of said NOT gate when said gear selector is set to said park position.

6. An arrangement according to claim 1, wherein said circuit arrangement includes
   a two input AND gate having one input coupled to the output of said testing circuit and an output coupled to a test input of said electronic control circuit; and
   circuit means coupled to said stop lights of said vehicle to provide a logic high on the other input of said AND gate upon occurrence of an inoperative hydraulic brake system.

7. An arrangement according to claim 6, wherein said circuit means includes
   a relay connected in parallel to said stop lights, said relay having a contact coupled to said other input of said AND gate to provide said logic high thereon when said relay is not energized.

8. An arrangement according to claim 7, wherein said circuit means further includes
   a NOT gate having its output coupled to said other input of said AND gate and its input coupled to ground potential by said control of said relay when said relay is not energized.

* * * * *

UNITED STATES PATENT OFFICE
CERTIFICATE OF CORRECTION

Patent No. 3,852,613   Dated December 3, 1974

Inventor(s) Franz Josef Wienecke

It is certified that error appears in the above-identified patent and that said Letters Patent are hereby corrected as shown below:

On the Front Page, between Data Element Identifier [21] and Data Element Identifier [52] insert "[30] Foreign Application Priority Data Oct. 5, 1972 Germany . . . . . . . P2248765.6."

Signed and sealed this 18th day of February 1975.

(SEAL)
Attest:

RUTH C. MASON
Attesting Officer

C. MARSHALL DANN
Commissioner of Patents
and Trademarks